United States Patent [19]

Dickey

[11] 4,188,082

[45] Feb. 12, 1980

[54] TELEPHONE WALL JACK

[75] Inventor: Donald F. Dickey, Arlington, Tex.

[73] Assignee: Superior Cable Corporation, Hickory, N.C.

[21] Appl. No.: 12,503

[22] Filed: Feb. 15, 1979

[51] Int. Cl.² ............................................. H01R 13/44
[52] U.S. Cl. ......................................... 339/36; 174/67
[58] Field of Search ........................ 339/36, 39, 40, 41; 174/67; 179/1 PC

[56] References Cited

U.S. PATENT DOCUMENTS

| 771,410 | 10/1904 | Beerwald | 339/40 |
| 2,988,242 | 6/1961 | Kneip | 174/67 |
| 3,068,442 | 12/1962 | Kubik et al. | 339/36 |
| 3,865,456 | 2/1975 | Dola | 339/40 |
| 4,040,699 | 8/1977 | Rasmussen | 339/91 R |

FOREIGN PATENT DOCUMENTS

| 1102234 | 3/1961 | Fed. Rep. of Germany | 339/40 |
| 1490638 | 9/1969 | Fed. Rep. of Germany | 339/40 |
| 1425461 | 12/1965 | France | 339/40 |

OTHER PUBLICATIONS

Crest Industries Advertisement, Jack With Self-Closing Door, Telephony, 4-24-1978.

*Primary Examiner*—Neil Abrams

[57] ABSTRACT

A telephone wall jack comprising a base plate having at least one rectangular shaped hole circumscribed by a jack housing composed of two directly opposing sidewalls connected together by a third sidewall extending perpendicular from the base plate and a top connected to the sidewalls and disposed parallel to and spaced apparent from the base plate. The top has one free edge containing a plurality of parallel slots adapted to receive spring contacts of a dielectric carrier. A biased gate is slidably positioned between the opposing sidewalls, operable from two positions, one which exposes the rectangular hole and the other which closes it. A cover is attached to the base plate covering the jack top housing and gate.

9 Claims, 7 Drawing Figures

TELEPHONE WALL JACK

FIELD OF THE INVENTION

This invention relates to the field of electrical connectors having multiple contacts.

BACKGROUND OF THE INVENTION

The direction of electrical technology today is towards smaller and smaller components. With regards to the telephone industry, technology today is towards the "modular apparatus" concept. Telephone apparatus normally seen and used by a telephone subscriber involves telephone handsets, cords and walls jacks or receptacles, these items being simply and easily plugged into one another to form electrical connection with a telephone transmission pair. In like manner, these items are easily removed and moved to another location and reconnected to the same or another telephone transmission pair all without the aid or necessity of a skilled telephone repairman. So called modular jacks and plugs are described in U.S. Pat. Nos. 3,990,764 and 3,850,497, a disclosure of both of these patents is herein incorporated by reference as if they were faithfully reproduced.

DESCRIPTION OF THE PRIOR ART

The prior art relating to the wall mountings contemplated by the instant invention is exemplified by FIGS. 1, 3 and 4 of U.S. Pat. No. 4,040,699. In such a disclosure there is shown a jack adapted to be mounted into a wall. Such a jack is basically a female type cavity into which a male connector is inserted to create an electrical connection. The jack, sometimes called a jack top housing, is connected to a telephone transmission pair and the male connector insertable into the jack top housing cavity is connected to a telephone handset. Once the male connector is inserted into the wall jack cavity, a communication circuit is completed. One embodiment of prior art jacks contemplates a gate means used to close the opening that forms the otherwise open connector cavity when such cavity is in non-use. The gate means is manually opened when the connection is desired to be made and is kept open by the presence of the male connector (plug) disposed in the jack housing such as is the case with the instant invention.

It has been found by experience that the prior art gate means, which depended upon gravity to keep it closed, is sometimes installed upside down and therefore such stays permanently open. In other cases, when installed in its correct position, i.e., so that the force of gravity would tend to keep the gate means closed, the gate itself becomes stuck or would bind against its housing and would nonetheless remain open when it was otherwise desired to be closed.

Most flush mounted wall jacks of this type are designed to be installed at the bottom third of a wall, in other words within the first three feet immediately above the floor. It has been found that with wall jacks of this type having exposed, i.e., opened, receptacles or cavities, dust, grime, grease along with condensation tend to collect in the connector cavity, which increase the attenuation of the electrical components of the connection and thereby produce undesirable transmission results. Consequently, anything that can be done to close off the wall jack cavity from the elements of the room during the time that such cavity is not in use, i.e., when the male connector is not engagably disposed in such cavity, is a desirable step forward. Such a practice reduces the amount of water condensation, grime, dirt and other foreign materials that tend to collect in such a cavity and otherwise create telephone transmission problems. Because such wall jacks are usually installed in the bottom third of a wall and because such jacks and cavities are left open, either by design or inadvertently, applicant has found there is a "chimney effect" that takes place. Convection currents are set up moving from the room, into the connector cavity and into the wall space. These currents of air are laden with dust particles and the like and tend to move from the room, into the jack cavity, over the electrical wiring and contacts used in the jack housing to make the electrical connection and out the back side of the jack housing up into the wall cavity itself. This so called "chimney effect" not only has a tendency to bring into the connector cavity and in contact with electrical components undesirable particulate matters such as dust, dirt, grease and the like but also tends to deposit water condensation on the electrical components in the connector cavity, such resulting from the temperature change of the air from warm room temperature to a colder temperature appearing in the wall itself. It is towards the solution of the problem created by condensation, dirt and grime on electrical components in the connector cavity that this invention is directed.

SUMMARY OF THE INVENTION

The flush mounted wall jack of the instant invention lends itself to miniaturization and the so called "modular concept" that is in vogue today in the telephone industry. More particularly the flush mounted wall jack is a jack that can be mounted essentially flush with a wall and is commonly located in the lower third of a wall, that portion of the wall closest to the floor. Telephone transmission lines that are connected to station wires are normally connected to the rear portion of the wall jack by screws or other convenient and well known means. In turn, these station wires are then thus placed in electrical connection with a dielectric electrical carrier which is in mechanical engagement with the flush mounted wall jack. The dielectric carrier has a plurality of spring contacts which are in electrical communication with the station wire, which are in electrical communication with a telephone transmission pair. The spring contacts protrude into a connector-receiving cavity, which is adapted to receive a male plug. The male plug has a plurality of electrical connectors, adapted to be in electrical connection with the spring contacts of the dielectric carrier. It is in electrical communication with a telephone handset cord, which is in ultimate electrical communication with a telephone handset cord, thus completing a communication circuit.

The telephone wall jack of the instant invention comprises a base plate having at least one rectangular shaped hole in it. This hole is circumscribed in part, namely on three sides, by a jack housing composed of two directly opposing sidewalls integrally connected one to another by a third sidewall. All of the sidewalls extend perpendicular from and integrally connected to the base plate. The two previously mentioned directly opposing sidewalls form a passageway which is in communication with the rectangular shaped hole. In combination with the base plate and jack housing is a gate means, slidably engaged between the directly opposed sidewalls from an open position, essentially exposing the rectangular shaped hole, to a closed position, essentially closing said rectangular shaped hole. The gate means is attached to a spring means and by means of the spring means the gate is biased to a closed position.

An enclosure means is removably affixed to the base plate that encloses the jack housing, thereby preventing the accumulation of dirt, dust and condensation which otherwise have a tendency to coat the spring contacts. Such a coating tends to attenuate any signal appearing in such contacts.

DESCRIPTION OF THE PREFERRED EMBODIMENT

Figure 3:
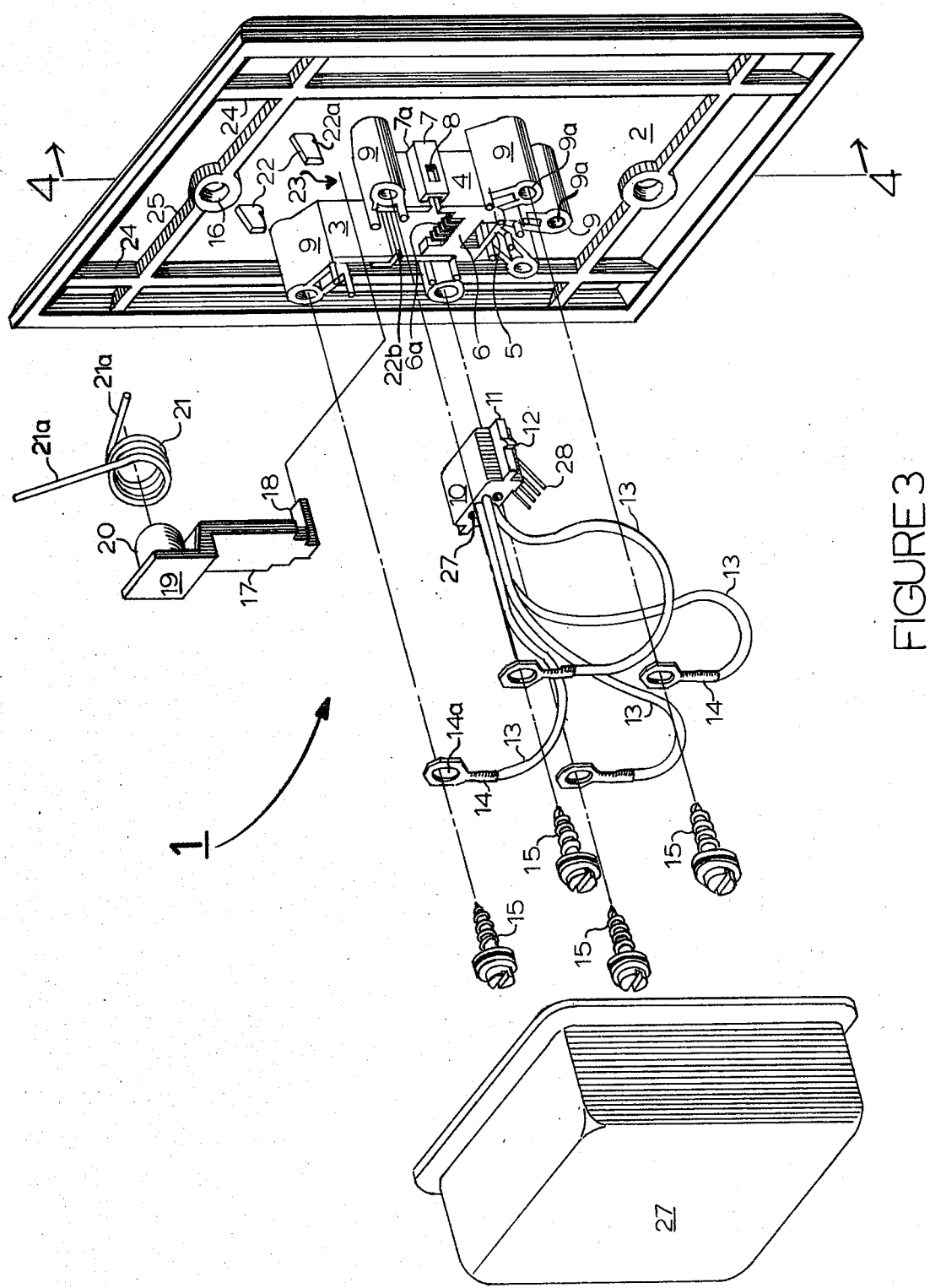
FIG. 3 is a three part exploded perspective view of the flush mounted wall jack.

Referring to FIG. 3, there is shown generally by element 1 the disclosed combination of a dielectric carrier 10, base plate 2 and jack top housing cover 27. The jack top housing is integrally connected to a base plate 2 and is composed of directly opposing sidewalls 3 and 4 connected together by sidewall 5 and roof or top 6. Integrally connected to the jack housing and base plate 2 are post 9 which are counterbored to receive screws 15. Sidewalls 3, 4 and 5 circumscribe, in part, hole 26 shown more clearly in FIG. 1. Sidewalls 3 and 4 form passageway 23, which is in communication with hole 26 and is adapted to receive gate means 17 in a slidably engagable manner. Base plate 2 has reinforcing ribs 24 and 25 and holes 16, which are used to affix the wall jack 1 to a bracket 29 disposed in a wall. See FIG. 6.

Jack housing sidewalls 3 and 4 contain directly opposing slots 22b which are covered on the outermost side of sidewalls 3 and 4 with a "U" shaped enclosure 7 having opposing legs 7A integrally attached to sidewall 4. Each "U" shaped enclosure means 7 has a laterally disposed opening 8, directly opposed one to another. The "U" shaped enclosure member 7 and slot 22b form a receiving cavity for tongue means 11 and protrusion 12 of dielectric carrier 10. Dielectric carrier 10 is inserted into the jack top housing, its tongue means 11 engaged in slots 22b until protrusions 12 are firmly seated in openings 8 and thus removably locked into its desired and intended position.

Dielectric carrier 10 is generally box shaped except that it has tongues 11 laterally extending from two of its opposing sidewalls. Each tongue 11 has a raised middle portion 12, which acts not only as a stop, but also as a locking means to lock the dielectric carrier into position within slots 22 and laterally extending openings 8 as previously described. In such a position, protrusions 12 abut against the terminal free edges of opening 8 thereby performing the locking effect.

Dielectric carrier 10 has a plurality of orifices 27 containing contact assemblies (not shown) which are in electrical connection with insulated electrical conductors 13 on one terminal portion and a spring contacts 28 on the other. Such orifices, contact assembly and spring contacts are the same as that disclosed in U.S. Pat. Nos. 3,990,764 and 3,895,497 to which specific reference is made for further details, no part of which is material to the instant invention.

Insulated electrical conductors 13 are connected to spade lugs 14 containing holes 14A through which screws 15 are adapted to be inserted and removably attached inside of counterbores 9A of posts 9. Telephone transmission wires, not shown, are in electrical communication with spade lugs 14 in a manner well known in the art. Spade lugs 14, as shown, are in electrical communication with insulated electrical conductors 13 and through contact assemblies (not shown) are in electrical communication with spring contacts 28 which are adapted to be received in grooves 6A. A plug (not shown) is adapted to be fitted into the remaining portion of the cavity created by the jack housing walls 3, 4 and 5. Such a plug and how it coacts with spring contacts 28 are shown in U.S. Pat. Nos. 4,040,699 and 3,761,861 to which reference is made for further details. U.S. Pat. No. 3,761,869 to Hardesty, et al may be referred to for further details of the plug and how such a plug fits into a jack cavity housing and cooperates with a dielectric carrier and the spring contacts thereof so as to form a communication circuit, i.e., by the terminals of the plug coming in contact with the spring contacts of the dielectric carrier.

Figure 4:
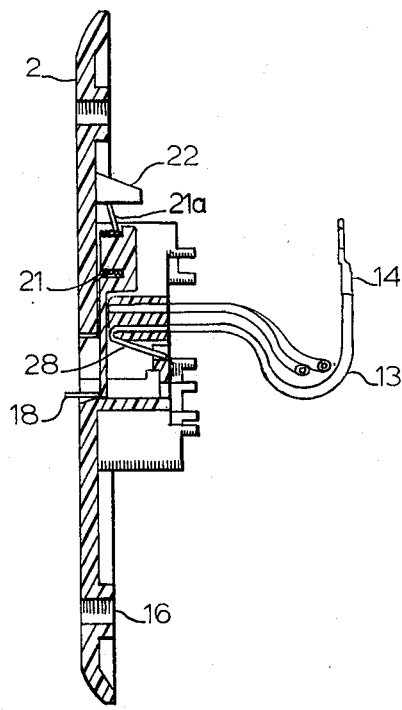
FIG. 4 is a crossectional view along lines 4—4 of FIG. 3.

Gate means 17 is disposed in the "U" shaped cavity formed by jack top housing walls 3, 4 and 5 and base plate 2. It is positioned between the dielectric carrier 10 and the surface of base plate 2 with tab 18 protruding beyond the opposite surface of base plate 2 as shown in FIG. 4. Gate 17 is slidably engaged in passageway 23 and may be reciprocated between a biased position that substantially closes hole 26 (see FIGS. 2 and 6) to a position essentially exposing hole 26. See FIG. 1. In order to keep gate 17 in a biased closed position, spring means 21 is provided having a terminal portion 21 disposed over post or protrusion 20. Post 20 is an integral part of "L" shaped portion 19 of gate 17. Terminal portions of spring means 21, namely elements 21a, abut against post 22 in notches 22a. These posts are integral with base plate 2. The open and closed position of gate 27 is shown by FIGS. 1, 2 and 5a and 5b respectively, FIG. 5b showing the spring 21 compressed biasing gate 17 to the closed position. Gate 17 contains a tab which is used to manually open and close the gate, such tab protruding out into free space generally perpendicular to the surface opposite from the surface containing the jack top housing.

Jack top housing cover 27 is provided to completely cover the previously described jack top housing, gate 17 and dielectric carrier 10. Such a housing is generally an open box, the terminal portions of the sidewalls forming the housing opening being flared slightly to form a flat surface (not shown). This surface is thus adapted to fit flush against the surface of base plate 2 shown in FIG. 3. Any suitable adhesive, e.g., (pressure sensitive types) can be used to removably affix jack top housing, dielectric carrier 10 and gate 17. The purpose of housing 27, standing alone and/or in combination with gate 17, is to reduce the amount of dirt, grime, grease and condensation accumulating inside the jack top housing and more particularly accumulating on the spring contacts 28 of dielectric carrier 10.

Figure 6:
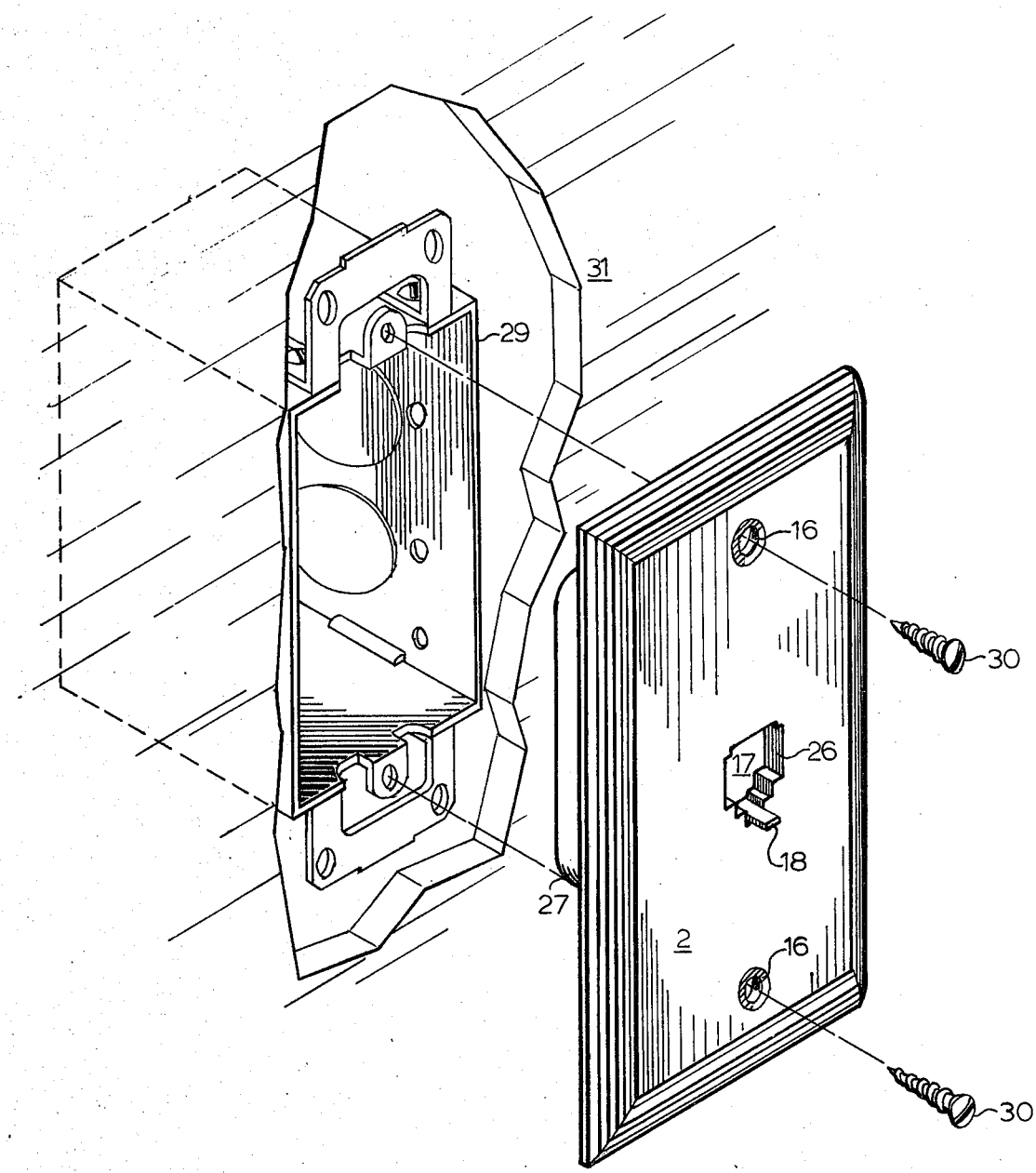
FIG. 6 is an exploded perspective view of composite base plate, jack housing and jack housing cover in association with a complimentary wall bracket.

Since the mounted wall jack of the instant invention is normally mounted with the jack top housing and its cover being disposed in the interior of a wall, see FIG. 6 for example, the colder air in the wall interiors would have a tendency to result in condensation accumulating in the cavity created by the jack top housing, if it were not for gate 17 and housing 27. Absent these items, warmer air from the interior of a room flowing through the rectangular hole 26 into the connector cavity as the result of convection currents would be the obvious source of such condensation and is referred to as "chimney effect." The reverse is also true, i.e., cold air in a room and warm air in the connector cavity creates convection currents with the same undesirable results. Water condensation accumulating on spring contacts 28 and/or the electrical connectors of a plug (not shown) can obviously be detrimental to the transmission quality of any commuinication circuit. By providing jack top housing cover 27 in the position disclosed, this chimney effect is considerably reduced. Furthermore, debris such as plaster, lint, dirt, grease and grime either falling from interior wall surfaces or otherwise brought into the connector cavity by means of convection current are avoided. Spring contacts 28 and the electrical contacts that abut against such contacts are generally gold plated in order to maintain a desired level of transmission quality. Because of the reduced size of such components necessary to the modular concept of telephone connectors and the inherent reduced electrical path, anything that can be done to shield such contacts from dirt, grease, grime and accumulation of condensation tends to improve the transmission quality of the telephone circuit.

Designers of telephone apparatus must literally "out think" the day to day frustrations created by telephone installers. A mounted wall jack not having a spring biased to keep a gate biased to a closed position would stand a 50—50 chance of being installed upside down, thus leaving hole 26 exposed to the room interior and its undesirable water laden warm air, lint, dust, grease and grime. Even a properly installed non-biased gate usually fails to close when a plug is removed from the electric cavity because such a gate means has a tendency to bind against the sidewalls in which it is slottably engaged. It thus becomes stuck in an open and undesired position. Last but not least, a gate means that is biased to the closed position tends to remove the temptation from curious children and adults alike from inserting metallic objects into the connector cavity thereby helping to preserve the integrity of the transmission path.

Figure 1:
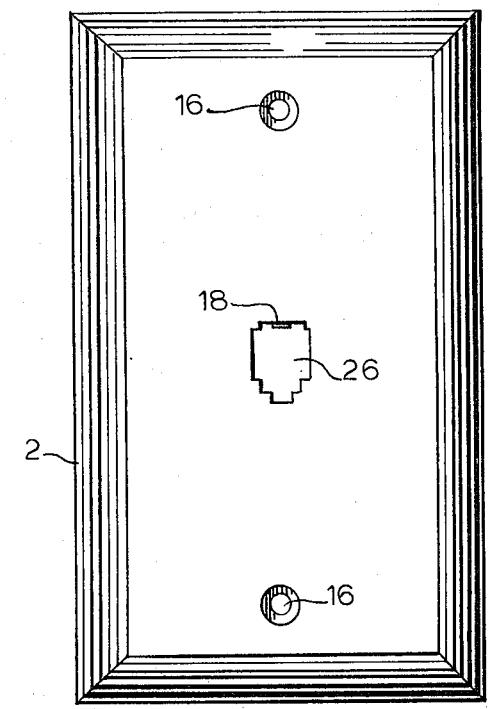
FIG. 1 is a plan view of the top side of the base plate of the invention showing the gate in an open position.
Figure 2:
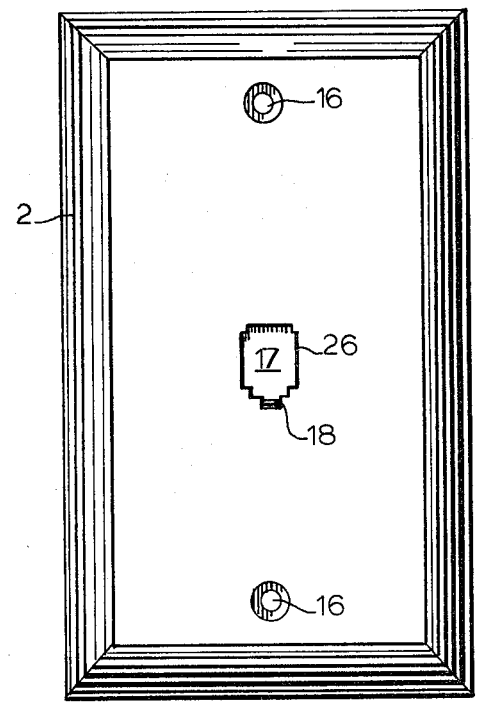
FIG. 2 is a plan view of the top side of the base plate showing a gate in a closed position.

FIGS. 1 and 2 show the exposed surface of the flush mounted wall jack and further shows tab 18, hole 26 and gate means 17. FIG. 1 shows gate 17 in the open position and tab 18 deposed against the uppermost boundary of hole 26. FIG. 2 shows gate 17 in the closed position with tab 18 resting on the lower extremity of hole 26.

Figure 5A:
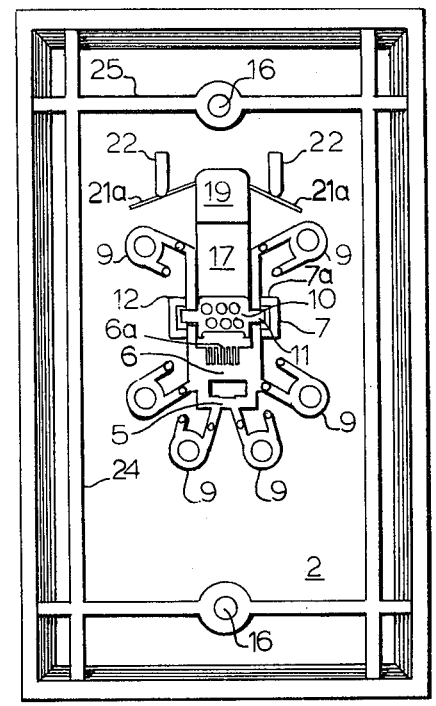
FIG. 5A is a plan view of the base plate, dielectric carrier and gate showing the gate in the closed position.
Figure 5B:
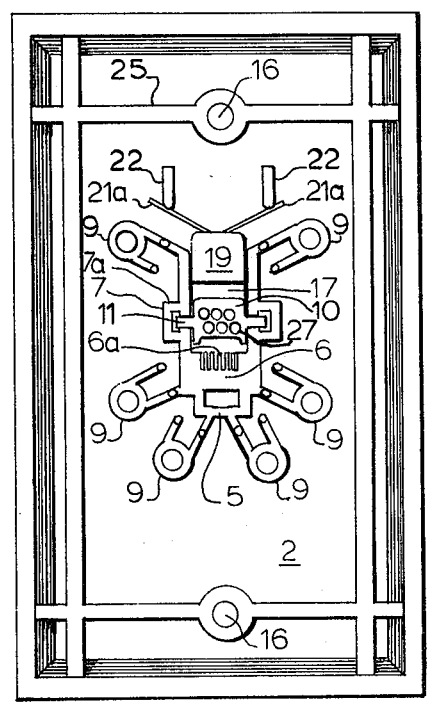
FIG. 5B is a plan view of the base plate, dielectric carrier and gate showing the gate in the open position.

FIGS. 5a and 5b, the reverse side of FIGS. 1 and 2 respectively, show the reverse side of base plate 2 and gate 17 in the open position (FIG. 5a) and gate 17 in the closed position (FIG. 5b). Element 22a is a notch (see FIG. 3) in which the terminal portions of Element 21a of spring 21 are disposed, providing a recess in which terminal portions 21a can be seated to firmly position gate 17 in its intended position.

An exploded assembly of the flush mounted wall jack is shown in FIG. 6, namely a combination of a base plate 2 and jack housing cover 27 and how it is intended to be attached to bracket 29 disposed within a wall 31. The wall jack is affixed to bracket 29 by means of screws 30 through screw holes 16.

It is to be understood that the embodiments described in this disclosure are merely illustrative for the principles of the invention. Various modifications may be made thereto by persons skilled in the art without departing from the spirit and scope of the invention.

I claim:

1. A telephone wall jack comprising:
   (a) a base plate having at least one rectangular shaped hole therein;
   (b) a jack housing circumscribing said hole on three sides composed of two directly opposing sidewalls integrally connected one to another by a third sidewall, all of said sidewalls extending perpendicular from and integrally connected to said base plate, said two directly opposing sidewalls forming a passageway in communication with said rectangular shaped hole and are connected by a top disposed parallel to and spaced apart from said base plate, said top having at least one free edge, said free edge containing a plurality of parallel slots adapted to receive spring contacts of a dielectric carrier;
   (c) a gate means disposed in said passageway slidably engaged between said directly opposed sidewalls from an open position, essentially exposing said rectangular shaped hole, to a closed position, essentially closing said rectangular shaped hole, and a spring means, said gate means being biased by said spring means to position the gate means in said closed position.

2. The telephone wall jack of claim 1 including a housing fixedly attached to said base plate and substantially enclosing said jack housing and gate means.

3. The telephone wall jack of claim 1 wherein said gate means is composed of a gate portion, a lift tab and a biasing assembly, said lift tab being integrally attached to one terminal edge of and extending perpendicular from a major surface of the gate and said biasing assembly being composed of a means for affixing a spring and said spring means attached to said last mentioned means.

4. The telephone wall jack of claim 3 wherein said biasing assembly is composed of an "L" shaped offset attached to said gate portion, a protrusion extending perpendicular to and integral with said offset and said spring means removably attached to said protrusion.

5. The telephone wall jack of claim 1 wherein said base plate has two protrusions integral with and extending perpendicular to it spaced apart from the terminal edges of said directly opposed sidewalls and the terminal portions of said spring being in contact therewith.

6. The telephone wall jack of claim 1 wherein each of said directly opposed sidewalls contain a slot, each directly opposed to the other.

7. The telephone wall jack of claim 6 wherein each of said directly opposed slots have a laterally disposed opening therein.

8. The telephone wall jack of claim 1 in combination with a unitary dielectric contact carrier, said carrier comprising a rectangular shaped dielectric body in which a plurality of metallic spring contacts are embedded and are in electrical communication with a like number of insulated electrical conductors, said rectangular body of said carrier having laterally extending tongues on two of its opposing sidewalls received in said jack top housing sidewalls and said spring contacts disposed in said plurality of parallel slots.

9. The telephone wall jack of claim 1 wherein each of said opposing jack top sidewalls contain a slot, one aligned with the other, each of said slots having a laterally disposed opening therein, a unitary dielectric carrier comprising a rectangular shaped dielectric body in which a plurality of metallic spring contacts are embedded and are in electrical communication with a like number of insulated electrical conductors, said carrier having laterally extending tongues each containing a protrusion on two of its opposing sidewalls, said tongues being seated in said jack top sidewall slots said protrusions being in locking engagement with said laterally disposed openings and said spring contacts being disposed in said plurality of parallel slots.

* * * * *